UNITED STATES PATENT OFFICE 2,356,795

PROCESS OF TREATING PROTEIN

Arthur Ebert Poarch, Chicago, Ill., assignor to The Glidden Company, Cleveland, Ohio, a corporation of Ohio No Drawing. Application October 3, 1941, Serial No. 413,449

15 Claims. (Cl. 260—112)

The present invention relates to the treatment of alkali soluble, precipitable proteins such as casein isolated vegetable proteins and the like.

According to the present invention a protein such as casein, isolated soybean protein or other alkali soluble, precipitable protein is dissolved in water with the aid of ammonium hydroxide. After solution is complete carbon dioxide gas is passed through the solution while maintaining the temperature above the decomposition temperature for ammonium carbonate and ammonium bicarbonate. The temperature, of course, should not be so high as to be destructive of the protein.

The carbon dioxide will first react with water to form carbonic acid, which will in turn neutralize any excess of ammonia present in the solution to form ammonium carbonate or ammonium bicarbonate. If the carbon dioxide were to be passed into the solution at normal temperatures there would be a simple neutralization reaction. However, when the temperature is then raised above the decomposition point the compounds dissociate into their basic constituents, namely, ammonia, water and carbon dioxide. Following the law of mass action the continued introduction of one of these decomposition products will tend to reverse the normal dissociation reaction and the result would be an elimination of the minor constituent. In the present case carbon dioxide and water are both in excess and ammonia is forced from the solution.

Thus if the reaction were stopped at a pH of 7 and held above the decomposition temperature, the resulting solution would contain a minimum amount of free ammonia, no ammonia-carbon dioxide products, and a very small percentage of carbon dioxide. When such a solution is allowed to cool dried films thereof contain much less soluble salts than would be introduced by a simple neutralization. This results in a film containing a minimum of readily soluble salts. Such conditions also result in a minimum formation of the readily water soluble ammonium proteinate in the dried material. Upon drying, the retained carbon dioxide in the solution leaves the film before the retained ammonia since carbon dioxide has the higher vapor pressure of the two compounds, thus preventing any local precipitation due to a dropping of the pH value below the isoelectric point.

Repeated tests have shown that this method of dissolving casein and isolated soybean protein has resulted in films having higher water resistance than other methods of solution. It also embodies the important feature that a solution may be produced which is neutral or acid in character, which is necessary to good stability. Likewise the elevated temperatures employed result in pasteurization of the protein solution which is further conductive to good stability. There is thus produced a stable solution substantially free of uncombined alkali as well as water soluble salts.

The following examples are illustrative of the invention:

Example I

|   | Parts |
|---|---|
| Isolated soybean protein or casein | 100 |
| Water | 400 |
| Ammonium hydroxide solution 28° Bé | 7–9 |

The protein is soaked in 300 parts of cold water for 10 minutes and the ammonia dissolved in the remaining 100 parts of water is then added. The temperature is raised to 160° F. and held with stirring until solution is complete.

To this solution is then added 200 parts of water and the temperature raised to 185° F. Carbon dioxide is then bubbled through the solution while maintaining the temperature until the pH of the solution drops to about 7 or below. Preservatives may be added if desired.

Solutions prepared in this manner may be employed for various purposes. They may be used in the manufacture of protein paints, paper coating compositions, sizing solutions, etc. They are particularly valuable where low alkalinity is desired, and have the advantage of being relatively free of added water soluble salts.

The treatment with carbon dioxide may be continued to the point where precipitation of the protein takes place. In such a case a precipitated protein is produced without the introduction of added salts. Thus the process may be employed in the isolation and purification of proteins such as vegetable proteins and casein. Of course, where a solution is desired the carbon dioxide treatment will be stopped short of precipitation, preferably about 7 or below. However, the pH value need not necessarily be reduced to 7 in all cases, it being considered that the invention broadly contemplates a treatment such that an appreciable amount of ammonia uncombined with protein is removed in the manner indicated.

It will, of course, be obvious that ammonium carbonate may be used in place of ammonium hydroxide to effect the initial solution of the protein. Also sulfur dioxide, or other acid gas which with ammonia forms salts, decomposable into volatile constituents below the boiling point of the protein solution, may be employed. Carbon dioxide, however, is a preferred gas.

Having described the invention what is claimed is:

1. The process of treating an alkali soluble, precipitable protein selected from the class consisting of casein and vegetable globulins which comprises passing an acid forming gas through an aqueous alkaline protein solution, said acid gas being one which with ammonium hydroxide forms salts decomposable into volatile constituents below the boiling point of the protein solution, said protein solution being one prepared by the use of a protein solvent selected from the class consisting of ammonium hydroxide and the aforementioned decomposable ammonium salts corresponding to the acid forming gases employed, while maintaining the temperature of the solution above the decomposition point of said salts, to effect appreciable elimination of ammonia uncombined with protein.

2. The process of treating an alkali soluble, precipitable protein selected from the class consisting of casein and vegetable globulins which comprises providing an aqueous ammonium hydroxide solution of said protein, and passing an acid forming gas through said solution which with ammonium hydroxide forms salts decomposable at temperatures below the boiling point of said solution, while maintaining the temperature above the decomposition point of said salts, to effect appreciable elimination of ammonia uncombined with protein.

3. The process of claim 1 in which the time of treatment is at least sufficient to remove substantially all of the ammonia uncombined with protein but is insufficient to effect precipitation of the protein.

4. The process of claim 1 in which the acid-forming gas is $CO_2$.

5. The process of treating an alkali soluble, precipitable protein selected from the class consisting of casein and vegetable globulins which comprises passing carbon dioxide through an aqueous ammonium hydroxide solution of said protein while maintaining the solution at a temperature above the decomposition point of ammonium carbonate and ammonium bicarbonate to effect appreciable elimination of ammonia uncombined with protein.

6. The process of claim 1 in which the acid-forming gas is $CO_2$ and the time of treatment is insufficient to effect precipitation of the protein.

7. The process of preparing a solution of an alkali soluble, precipitable protein selected from the class consisting of casein and vegetable globulins which comprises dissolving the protein in water with the aid of ammonium hydroxide, and passing carbon dioxide into the solution while maintaining the solution at a temperature above the decomposition point of ammonium carbonate and ammonium bicarbonate to effect appreciable elimination of ammonia uncombined with protein.

8. The process of claim 1 in which the protein is casein and the acid-forming gas is $CO_2$.

9. The process of claim 1 in which the protein is soybean protein and the acid-forming gas is $CO_2$.

10. The process of claim 1 in which the protein is casein, the acid-forming gas is $CO_2$, and the time of treatment is insufficient to effect precipitation of the protein.

11. The process of claim 1 in which the protein is soybean protein, the acid-forming gas is $CO_2$ and the time of treatment is insufficient to effect precipitation of the protein.

12. The process of claim 1 in which the time of treatment is sufficient to effect precipitation of the protein.

13. The process of claim 1 in which the protein is soybean protein and the time of treatment is sufficient to effect precipitation of the protein.

14. The process of claim 1 in which the protein is soybean protein, the acid-forming gas is $CO_2$, and the time of treatment is sufficient to effect precipitation of the protein.

15. The process of claim 1 in which the time of treatment is insufficient to effect precipitation of the protein.

ARTHUR EBERT POARCH.